Oct. 5, 1937.  B. H. CAMPBELL  2,095,026
BRAKE
Filed Jan. 16, 1937  2 Sheets-Sheet 1
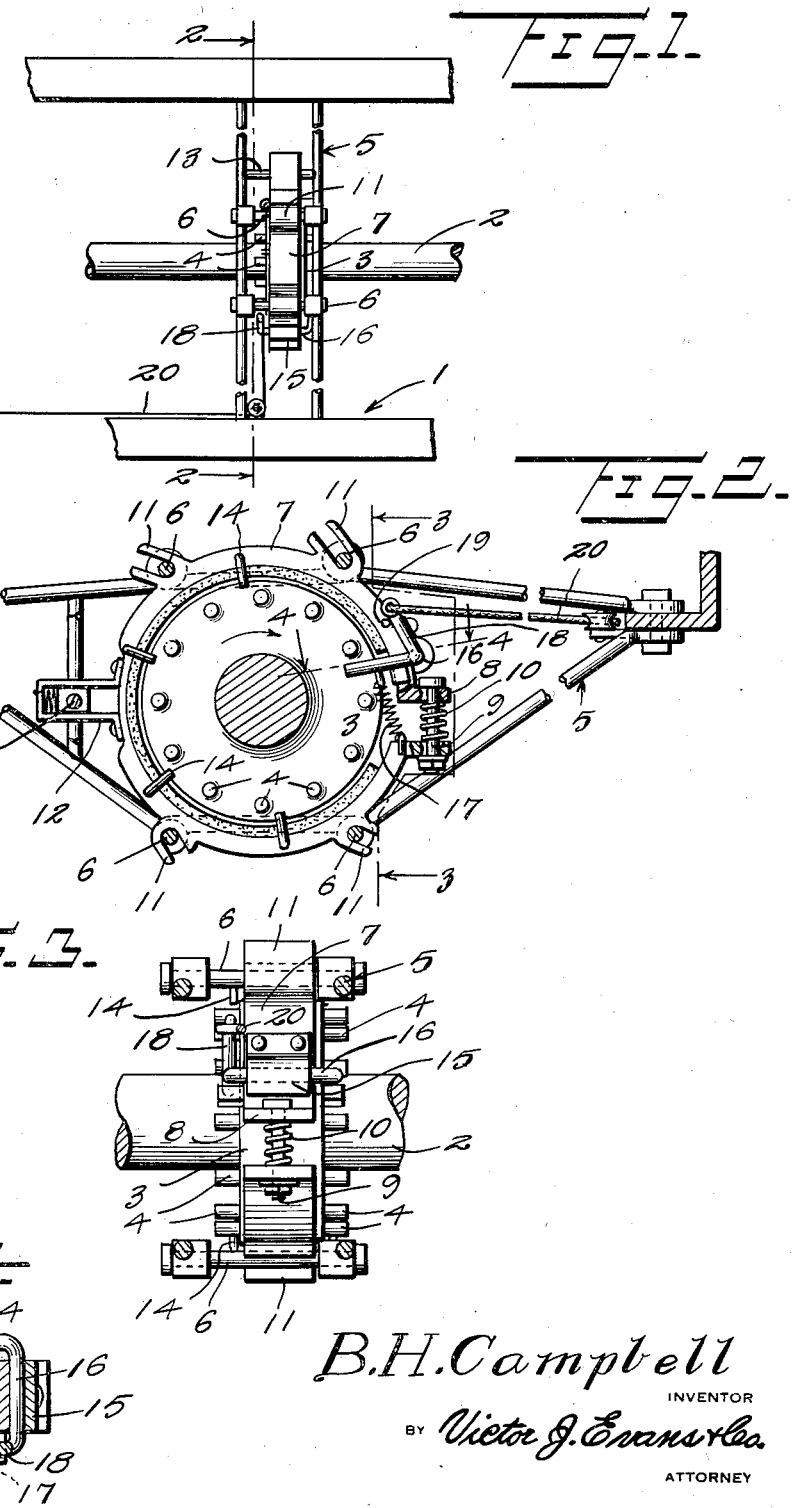
B.H. Campbell
INVENTOR
BY Victor J. Evans & Co.
ATTORNEY Oct. 5, 1937.   B. H. CAMPBELL   2,095,026
BRAKE
Filed Jan. 16, 1937   2 Sheets-Sheet 2
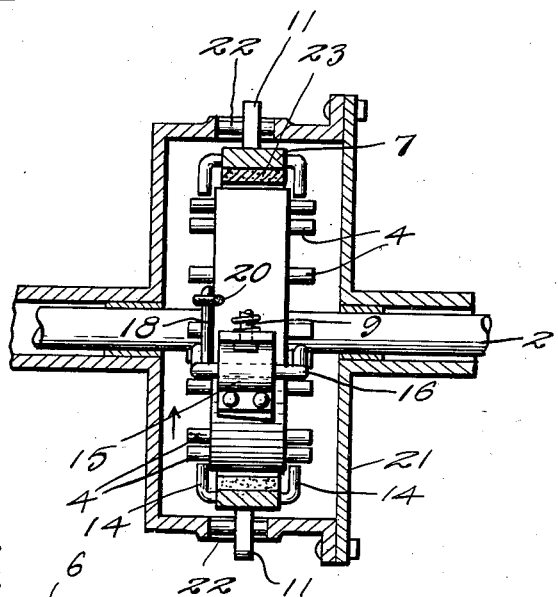
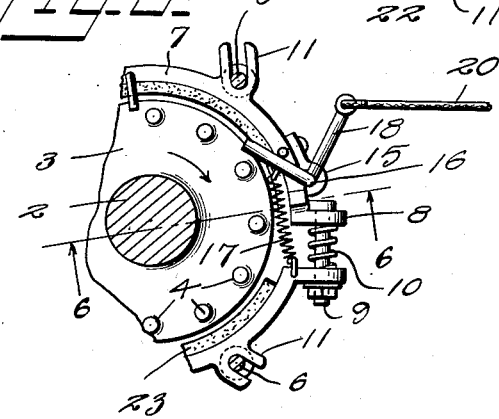
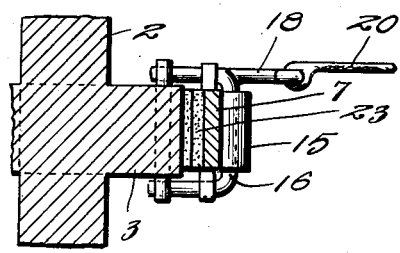
B. H. Campbell
INVENTOR
BY Victor J. Evans & Co.
ATTORNEY Patented Oct. 5, 1937

2,095,026

UNITED STATES PATENT OFFICE 2,095,026

BRAKE

Bruce H. Campbell, Atlanta, Ga.

Application January 16, 1937, Serial No. 120,997

2 Claims. (Cl. 188—30)

This invention relates to automatic or safety brakes for motor vehicles and has for the primary object the provision of a device of this character which may be readily adapted to a motor vehicle or its drive shaft to prevent the vehicle from moving rearwardly on a grade or hill when brought to a stop and prior to again starting forward and which will automatically permit the vehicle to proceed forward when power is applied to the drive shaft from the engine of the vehicle, the device having means for rendering the same operative and inoperative as desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary plan view showing a part of a motor vehicle with a brake applied thereto and constructed in accordance with my invention.

Figure 2 is a sectional view taken on the line 2—2 of Figure 1.

Figure 3 is a sectional view taken on the line 3—3 of Figure 2.

Figure 4 is a detail sectional view taken on the line 4—4 of Figure 2.

Figure 5 is a fragmentary transverse sectional view showing the brake rendered inoperative.

Figure 6 is a sectional view taken on the line 6—6 of Figure 5.

Figure 7 is a fragmentary vertical sectional view showing a modified form of my invention.

Referring in detail to the drawings, the numeral 1 indicates a fragmentary portion of a chassis of a motor vehicle and 2 the drive shaft, the latter having secured thereon a brake drum 3 provided upon opposite faces thereof with relatively spaced pins 4.

Mounted on the chassis 1 is a supporting frame 5 of skeleton formation including pairs of upper and lower horizontally arranged bars 6 for supporting a brake shoe 7 in proper relation to the periphery of the drum. The brake shoe is of the split type, the ends being indicated by the character 8 and are apertured to receive a bolt 9 having thereon a coil spring 10 acting against the ends of the brake shoe for expanding the latter away from the periphery of the drum. Forked portions 11 are formed integrally with the brake shoe and slidably receive the supporting rods 6 of the frame 5. The forked portions 11 extend tangentially to the periphery of the brake shoe. The forked portions permit the brake shoe to expand and contract. Opposite to the ends 8 of the split brake shoe a bracket 12 is secured thereto and said bracket is yieldably connected to the frame 5, as shown at 13. The bracket 12 cooperates with the forked portions in movably supporting the brake shoe in relation to the brake drum. Substantially U-shaped guide elements 14 are secured to the brake shoe and act to retain the brake shoe in proper alignment with the brake drum. The guides terminate at opposite sides of the brake drum and out of the path of movement of the pins 4.

Adjacent one of the ends 8 of the brake shoe a journal 15 is provided. The journal supports a dog 16 of substantially U-shape. The dog being of the shape described straddles the drum and has connected thereto a coil spring 17 acting to position the ends of the dog in the path of the pins 4. An arm 18 is formed on the dog and abuts with a stop 19 under the action of the spring 17. Connected to the arm 18 is a flexible element 20 extending to a place upon the motor vehicle which will be in convenient reach of the operator and may have connected thereto a suitable control (not shown), which when in one position will hold the dog out of the path of the pins and when released from said position will permit the spring 17 to move the dog into the path of the pins.

The drive shaft 2 rotates in the direction of the arrow in Figures 2 and 5 when the vehicle is in reverse motion.

In operation, when the driver of the vehicle brings the latter to a stop on a hill or grade the control cable 20 is actuated permitting the dog to assume the position as shown in Figure 2, that is, in the path of the pins 4 so that should the vehicle start to move in a reverse direction downhill or grade the dog will be engaged by a pair of the pins and thereby prevent the drive shaft from rotating in the direction indicated by the arrow in Figure 2. However, as soon as power is applied to the drive shaft 2 to bring about forward motion of the vehicle, the dog may ratchet relative to the pins. After the vehicle has proceeded from the hill, the operator may by actuating the control position the dog as shown in Figure 5 so that the dog will be out of the path of the pins. When pins of the drum engage the dog during the rotation of the drive shaft in the direction indicated by the arrows in Figures 2 and 5 the brake shoe will be caused to contract and grip the periphery of the drum, consequently preventing the vehicle from moving in a reverse direction.

Instead of employing the frame 5 a housing 21 may be used and in which the drive shaft 2 is journaled. The housing 21 is anchored in any suitable manner on the motor vehicle and is provided with slots having rods 22 extending across said slots and secured to said housing. The rods 22 are received in the forked portions 11 of the brake shoe. The housing 21 acts to protect the brake from foreign matter as well as providing a support for the brake shoe.

The brake shoe is equipped with a brake lining 23.

Having described the invention, I claim:

1. A brake comprising a drum secured to a drive shaft of a motor vehicle, a split shoe surrounding the drum, spring means acting to expand the shoe away from the drum, forked portions formed on the shoe and extending tangentially thereto, a supporting means including bars received by the forked portions, a yieldable connection between the shoe and the supporting means, and a manually controlled ratchet means between the shoe and drum to bring about contraction of the shoe on the drum by rotation of the drive shaft in a reverse direction.

2. A brake comprising a drum secured to a drive shaft of a motor vehicle, a split shoe surrounding the drum, spring means acting to expand the shoe away from the drum, forked portions formed on the shoe and extending tangentially thereto, a supporting means including bars received by the forked portions, a yieldable connection between the shoe and the supporting means, pins secured to the drum, a spring actuated dog carried by the shoe and normally positioned in the path of the pins to bring about contraction of the shoe against the drum by the rotation of the drive shaft in a reverse direction, and a control means connected to the dog whereby the latter may be positioned out of the path of said pins.

BRUCE H. CAMPBELL.